United States Patent [19]

Skudera, Jr. et al.

[11] Patent Number: 4,965,581
[45] Date of Patent: Oct. 23, 1990

[54] REAL-TIME REJECTION CIRCUIT TO AUTOMATICALLY REJECT MULTIPLE INTERFERING HOPPING SIGNALS WHILE PASSING A LOWER LEVEL DESIRED SIGNAL

[75] Inventors: William J. Skudera, Jr., Oceanport; Stuart D. Albert, Bricktown, both of N.J.

[73] Assignee: The United States of America as represented by the Secretary of the Army, Washington, D.C.

[21] Appl. No.: 461,943

[22] Filed: Jan. 8, 1990

[51] Int. Cl.$^5$ .............................. G01S 7/36; H04B 1/10
[52] U.S. Cl. ........................................ 342/19; 307/520; 328/165; 455/303
[58] Field of Search .................... 342/17–19; 455/303, 306, 307, 311; 328/165, 167; 307/520, 353; 333/193, 194

[56] References Cited

U.S. PATENT DOCUMENTS

| | | | |
|---|---|---|---|
| 3,155,912 | 11/1964 | Applebaum et al. | 328/165 X |
| 3,495,244 | 2/1970 | Rosa | 455/303 X |
| 3,588,534 | 6/1971 | Campbell | 307/520 |
| 4,038,539 | 7/1977 | Van Cleave | 328/165 X |
| 4,521,917 | 6/1985 | Holt | 328/165 X |

Primary Examiner—Gilberto Barrón, Jr.
Attorney, Agent, or Firm—Michael Zelenka; John M. O'Meara

[57] ABSTRACT

A real-time rejection circuit for passing low level desired signals in the presence of one or more strong, interfering signals. A chirp-Z transform system separates the various frequency components of a received signal into frequency segregated time domain signals. A power splitter separates the time domain signal into two paths. One path includes a modulator or switch that is normally biased "ON" for passing the time domain signal. The second path includes a diode detector that produces pulses of sufficient strength when a strong interfering component is present to override the bias and turn the modulator "OFF" for a sufficient period of time to attenuate the unwanted frequency components in the other path. The modulator output will primarily contain the low level desired frequency components that are passed through an inverse transform device for producing a frequency domain signal of the desired signal uncorrupted by unwanted signals.

2 Claims, 2 Drawing Sheets

REAL-TIME REJECTION CIRCUIT TO AUTOMATICALLY REJECT MULTIPLE INTERFERING HOPPING SIGNALS WHILE PASSING A LOWER LEVEL DESIRED SIGNAL

The invention described herein may be manufactured, used, and licensed by or for the Government for governmental purposes without the payment to us of any royalties thereon.

BACKGROUND OF THE INVENTION

1. Field of the Invention

The present invention relates to RF signal processing and, more particularly to a real-time signal rejection circuit that automatically rejects multiple interfering hopping signals while passing a lower level desired signal.

2. Description of the Prior Art

In the field of electronic warfare, it has been the general practice to employ various electronic jamming techniques wherein RF emitters transmit interfering signals at one or more frequencies to obstruct the RF communications of others. Such jamming emitters may be fixed, i.e. transmitting energy at a fixed narrow frequency band, or they may be agile, i.e. transmitting energy at different narrow frequency bands that vary with time (frequency hopping).

To counteract the effects of such jamming, a variety of antijamming devices have been developed. One such device for use with wideband receivers employs a rejection circuit that suppresses one frequency or band of frequencies while passing all other frequencies. One of the most critical problems confronting designers of these rejection circuits for use with wideband receivers in the presence of narrowband interferers has been maintaining sufficient receiver sensitivity so that the power levels of strong interfering signals are significantly reduced while not attenuating a much weaker desired signal. This problem is overcome by the present invention.

SUMMARY OF THE INVENTION

The general purpose of this invention is to provide a real-time rejection circuit for interference protection of wideband receivers while maintaining high receiver sensitivity. The present invention embraces all the advantages of similarly employed rejection circuits, attaining the same or better results with a simpler, more easily designed combination of components.

To attain this, the present invention contemplates a rejection circuit having a transform means for separating the frequency components of a received signal into a frequency segregated time domain. A gating circuit, normally biased "ON", passes the desired frequency components in the time domain to an inverse transform means for recovering the RF signal by transforming the time domain signal into frequency segregated time domain signals. Stronger frequency components in the time domain signal are detected and used to overcome the bias of the gating circuit to turn the gate "OFF" thereby blocking the stronger components.

It is, therefore, an object of the present invention to provide an interference protection circuit that automatically rejects one or more interfering signals while passing lower level desired signals.

Another object is the provision of a real-time rejection circuit for use in a wideband receiver that will maintain high sensitivity in the presence of agile or fixed narrowband interferers.

A further object of the invention is to provide a real-time rejection circuit having a simpler combination of components that may be more easily designed than conventional circuits used for a similar purpose.

Other objects and many of the attendant advantages of this invention will be readily appreciated as the same becomes better understood by reference to the following detailed description when considered in connection with the accompanying drawings.

DETAILED DESCRIPTION OF THE PREFERRED EMBODIMENTS

Figure 1:
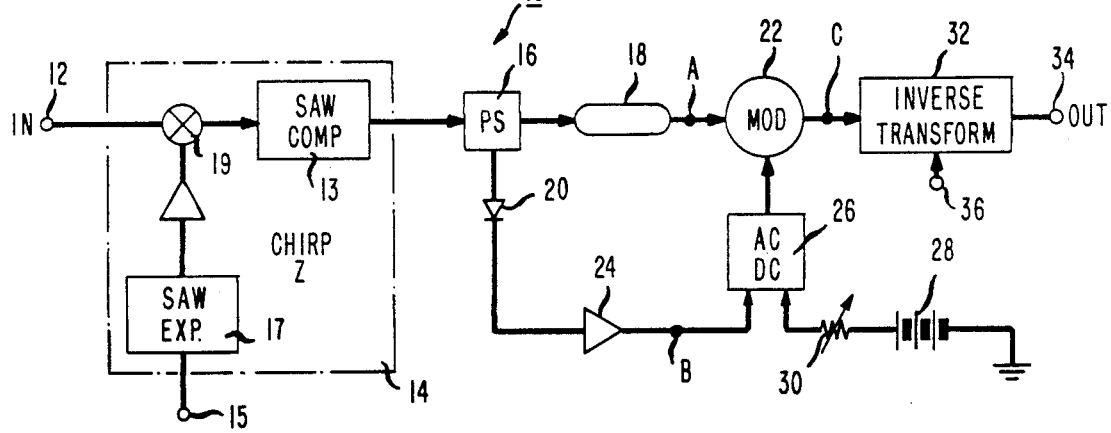
FIG. 1 is a schematic diagram of a preferred embodiment.
Figure 5:
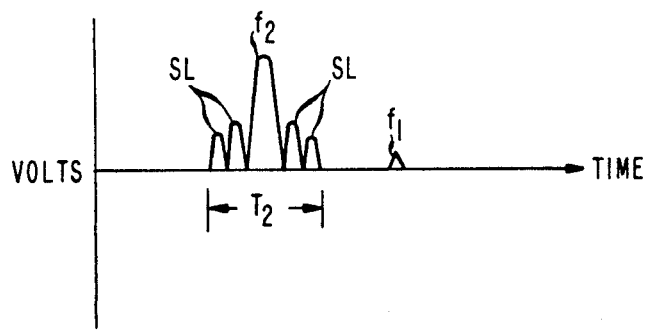
FIG. 5 is a graph useful in understanding the embodiment of FIG. 4.

Referring now to the drawings, there is shown in FIG. 1 a rejection circuit 10 having an input terminal 12 connected to a conventional chirp-Z transform system 14 such as shown and described by Hays et al. in "Surface Wave Transform Adaptable Processor System", 1975 *Ultrasonics Symposium Proceedings*, IEEE Cat. No. 75 CHO 994-4SU, pp. 363-367. As noted in Hays et al., the chirp-Z system 14 transforms time domain input signals into frequency segregated time domain signals having frequency components separated in time. In FIG. 5 on page 368 of Hays et al., a circuit is shown that can be used to manually gate out undesired frequencies. This method works well if the user manually observes on an oscilloscope where to place the gate signal; or if the user knows what the frequency is before-hand, then a clock gate can be manually set. As will become clear below, the present circuit 10 does not require the user to know what the frequency is or where to set the gate position. Circuit 10 automatically and quickly (in nanoseconds) knocks down multiple fixed frequency or hopping interferers while preserving weaker desired signals.

System 14 includes a chirp-Z input terminal 15 for inputting a chirp signal to a surface acoustic wave (SAW) expander 17. A multiplier 19 mixes an amplified version of the output of the SAW expander 17 with the input signal on terminal 12. The product from multiplier 19 is compressed in a SAW compressor 13 to produce a chirp-Z transform of the input signal.

The output of the chirp-Z system 14 is connected to a power splitter 16 having two outputs. One output is connected to a delay line 18 while the other output is connected to a diode detector 20. The output of delay line 18 is connected to the input of a modulator 22. The diode 20 is connected to a video amplifier 24 whose output is connected to the input of an AC-DC isolation box 26. A positive fixed bias voltage is connected to box 26 via a battery 28, or other conventional power supply, and an adjustable resistor 30. The output of box 26 is connected to an enable gate input on modulator 22. The output of modulator 22 is connected to a conventional inverse chirp-Z transform device 32. Device 32 typically has the same components as system 14 with a slightly different arrangement as shown in Hayes et al., cited above. Device 32 has input and output terminals 36, 34, respectively.

Figure 2:
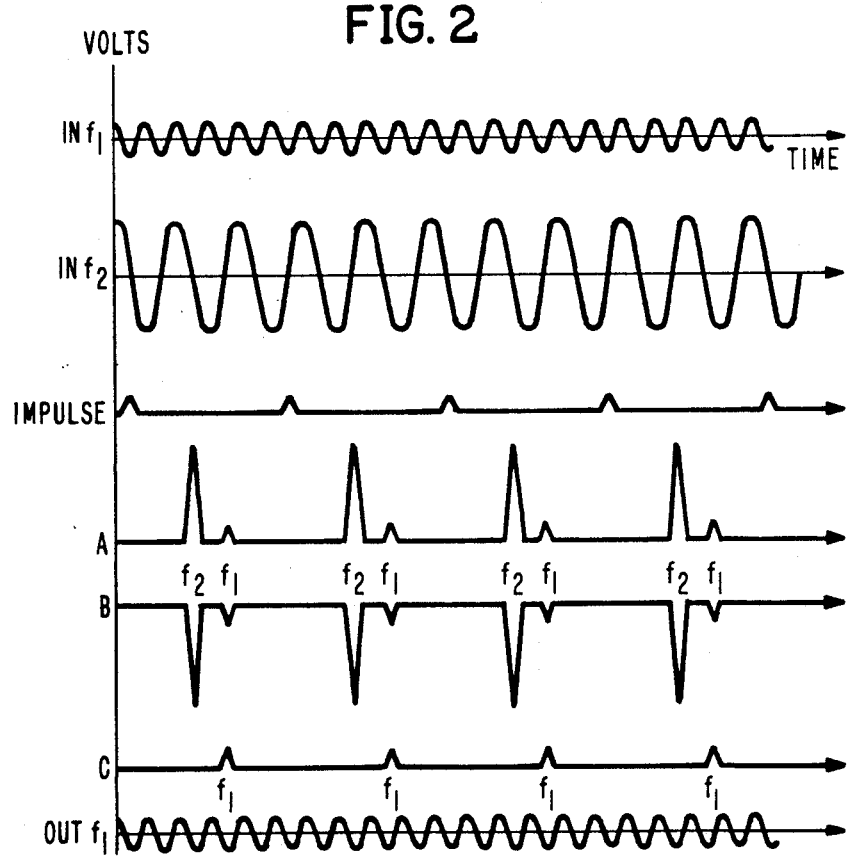
FIG. 2 is a graph illustrating several waveforms that appear throughout the circuit of FIG. 1.

FIG. 2 illustrates typical waveforms useful in understanding the operation of the rejection circuit 10. Signals f1 and f2 represent the frequency components of the center frequency of a relatively weak desired signal and the center frequency of a stronger, narrowband interference signal, respectively, the composite of which represents the received signal appearing at the input terminal 12. The conventional chirp-Z transform system 14 will separate the frequency components f1 and f2 (plus any other components present in the time domain input signal) into frequency segregated signals in the time domain as shown by waveform A. The impulse signal represents the input to terminals 15 and 36.

The modulator 22, normally biased "ON" by a positive voltage provided by variable resistor 30 and battery 28, will pass the desired weak component f1 to the output. However, modulator 22 when gated "OFF" by a sufficiently negative signal will appreciably attenuate signals appearing at point A. With proper adjustment of resistor 30 and the delay 18 the large negative pulses appearing at the output of amplifier 24 (waveform B) will be sufficiently negative to turn "OFF" the modulator 22 at those instances when the unwanted components f2 in waveform A appear at the input to modulator 22. As such, the f2 components will be significantly attenuated, leaving only the f1 components at the input to device 32 as shown in waveform C. An inverse chirp-Z transform of waveform C will be performed by device 32 to produce a frequency domain signal containing primarily the weak signal f1.

Figure 3:
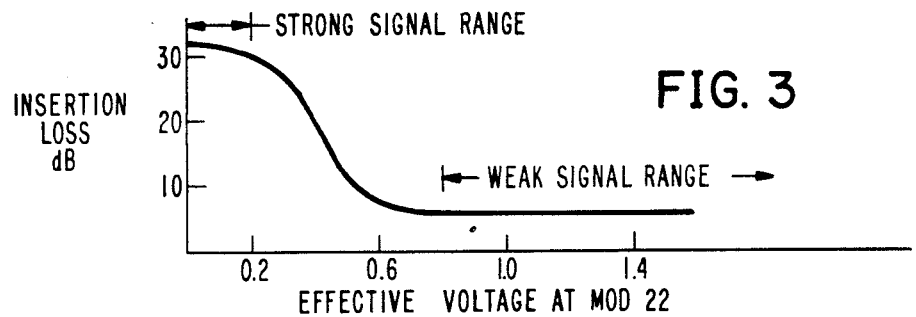
FIG. 3 is a graph illustrating the relationship between parameters of the FIG. 1 circuit.

FIG. 3 is a graphical illustration showing a typical variation between the insertion loss of the circuit 10 versus the effective bias voltage at the modulator 22 which, for example, may be implemented with a reasonably fast switch, such as the Watkins-Johnson S-1. Representative values for the curve in FIG. 3 appear in the following table.

| WAVEFORM B VOLTS | EFFECTIVE BIAS VOLTAGE OF MODULATOR 22 | APPROXIMATE INSERTION LOSS OF MODULATOR 22 |
| --- | --- | --- |
| −0.2 | 1.3 | 5.5 dB |
| −0.5 | 1.0 | 5.5 dB |
| −0.7 | 0.8 | 6.0 dB |
| −1.0 | 0.5 | 12.0 dB |
| −1.1 | 0.4 | >20 dB |
| −1.5 | 0.0 | >30 dB |

Figure 4:
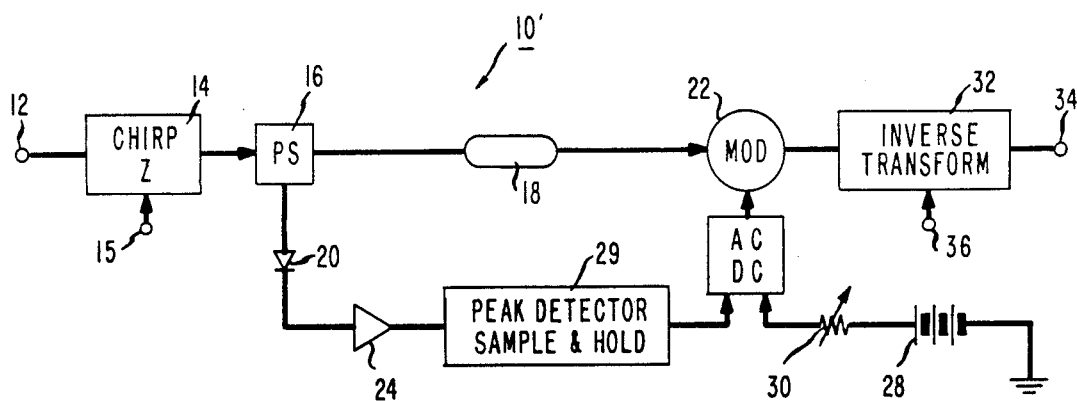
FIG. 4 is a schematic circuit diagram of a modification of the FIG. 1 embodiment.

FIG. 4 illustrates a variation of the FIG. 1 embodiment. Circuit 10' includes means to retain the spectrial purity of weak desired signals (f1) that are below or equal to the amplitude of the sidelobes (SL) of a strong interfering signal (f2) as shown in FIG. 5. The circuit 10' of FIG. 4 is similar to the circuit 10 of FIG. 1 with the addition of the peak detector/sample-and-hold circuit 29. The circuit 29 is provided to increase the width of the "GATE OFF" time for modulator 22 to the value T2 so that the first and second sidelobes SL, always present in a chirp-Z transform, can be removed along with the main lobe f2.

Figure 6:
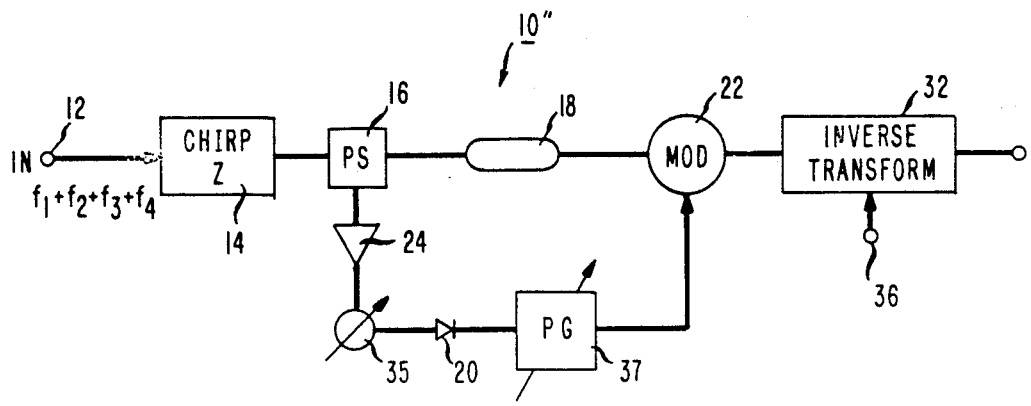
FIG. 6 is a schematic diagram of still another embodiment of the invention.

Still another variation is shown in FIG. 6. The circuit 10" includes an alternate method of obtaining "GATE OFF" time. In circuit 10", one of the outputs of power splitter 16 is amplified by amplifier 24 and then attenuated in an adjustable RF attenuator 35. The attenuated signal is then diode detected by diode 20. A pulse generator 37, such as a Hewlett Packard model 8082 A, normally puts out a fixed bias to gate modulator 22 "ON" while passing signals to the inverse chirp-Z transform device 32. However, when a significantly negative signal f2 is received from diode 20, pulse generator 37 is triggered to output the required negative voltage pulse to gate "OFF" modulator 22. In addition, the pulse generator 37 has an adjustable pulse duration control so that the modulator 22 can be gated "OFF" for some predetermined time so that the highest sidelobes SL (FIG. 5) are removed. With strong interfering signals separated by more than the frequency resolution of the chirp-Z, the circuit 10" of FIG. 6 will readily pass desired signals at significantly lower power levels in the order of 20 dB. Using the circuit of FIG. 6, a low level signal f1 can be greater than 30 dB below strong interfering signals if a sufficiently wide "GATE OFF" pulse from the generator 37 is employed. Of course, the interfering signals can be either fixed or hopping.

Various other modifications are contemplated and may obviously be resorted to by those skilled in the art without departing from the spirit and scope of the invention, as hereinafter defined by the appended claims, as only preferred embodiments thereof have been disclosed.

What is claimed is:

1. A rejection circuit comprising:
an RF input terminal;
transform means for transforming a time domain RF signal on the RF input terminal into a frequency segregated time domain signal having frequency components separated in time, each said frequency component having a main lobe and two side lobes on either side of said main lobe;
a normally ON gate means for passing said time domain signal to an output; and
pulse means for causing strong frequency components in said time domain signal having a magnitude greater than a predetermined level to turn the gate means OFF for a period of time to substantially block the strong frequency components, said period of time being established by a peak detector-sample and hold circuit means and spanning the main and two side lobes.

2. The circuit of claim 1 wherein said pulse means includes a pulse generator means for turning said gate "OFF" for said period of time.

* * * * *